United States Patent Office 3,516,789
Patented June 23, 1970

3,516,789
PROCESS FOR THE MANUFACTURE OF
HYDROCYANIC ACID
Kurt Sennewald, 11 Gartenstrasse, and Wilhelm Vogt, 5
Dr. Krauss-Str., both of Knapsack, near Cologne, Germany; Joachim Kandler, 10 Amselweg, Lechenich, Germany; and Gunter Sorbe, 37 Bielefelder Str., Lenzinghausen, near Herford, Germany
No Drawing. Continuation-in-part of application Ser. No. 227,732, Oct. 2, 1962. This application Jan. 25, 1968, Ser. No. 700,365
Claims priority, application Germany, Oct. 4, 1961, K 44,855
Int. Cl. C01c 3/02; B01j 11/32; C07c 121/32
U.S. Cl. 23—151                                         5 Claims

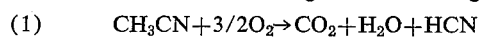

ABSTRACT OF THE DISCLOSURE

A catalytic process for manufacturing hydrocyanic acid from acetonitrile in the presence of oxygen or air at about 300–350° C. for about .05–50 seconds in the presence of $Fe_2O_3/Bi_2O_3/MoO_3/P_2O_5/SiO_2$.

The present invention is a continuation-in-part of Ser. No. 227,732, filed on Oct. 2, 1962 and now abandoned and relates to a process for transforming acetonitrile into hydrocyanic acid, especially the acetonitrile obtained as a by-product in the manufacture of acrylonitrile.

In U.S. Pat. 2,481,826, for example, there is described a process for making acrylonitrile from propylene or another low olefin and ammonia, wherein especially acetonitrile and hydrocyanic acid are obtained as the by-products. Since hydrocyanic acid can readily be used and utilized in industry, the formation of that compound does not amount to a reduction of the yield obtained. On the contrary, acetonitrile has not previously been used on a substantial scale. In other words, acetonitrile is a rather undesired by-product. Depending on the composition of the catalyst used for making the acrylonitrile, about 2 to 20%, especially 2 to 10%, acetonitrile are formed, calculated on the propylene or other olefin reacted.

The catalysts used for the manufacture of acrylonitrile include the following metals or their oxides, which may be used alone or in combination: thorium, molybdenum, vanadium, tin, chromium, tungsten, cobalt, iron, manganese, nickel, copper or bismuth. These catalysts are generally supported on a carrier, such as aluminum oxide, silica gel or pumice. It is also advantageous to combine these catalysts with phosphoric acid. The reaction temperatures are within the range of about 300 to 550° C. and the pressures are within the range of about 0.1 to 10 atmospheres absolute. The mixture of olefin-air-ammonia is allowed to stay over the catalyst for a period of time of about 0.05 to 50 seconds, preferably about 0.2 to 20 seconds. The volume (molar) ratio of the reaction partners may vary within wide limits. For example, about 1 to 10 mols ammonia, 1 to 40 mols oxygen, which is preferably in the form of air, and about 5 mols steam may be used per mol olefin. The reaction may be carried out with the use of a solid bed catalyst or, when the catalyst mass is moved, with the use of a fluidized bed or flowing bed catalyst.

We have now found that the above-mentioned catalyst metal oxides, especially the oxides of molybdenum, vanadium, tin, iron and bismuth, which can be used for transforming an olefin, ammonia and oxygen into acrylonitrile, can also be used for accelerating the conversion of acetonitrile into hydrocyanic acid in the presence of air. To this end, a mixture of air with about 1% by volume acetonitrile in vapor form, which has been separated from acrylonitrile, is passed at a velocity of about 80 to 130 cm./sec. through a fluidized bed reactor charged with a catalyst in powder form having a grain size within the range of 0.1 to 0.2 mm. The reactor is heated to the reaction temperature typical of each catalyst, which is within the range of 300 to 550° C. The reaction gas produced in and leaving the reactor contains the hydrocyanic acid produced and unreacted acetonitrile. A part of the acetonitrile has, however, been burnt to carbon dioxide. In this manner, about 50 to 70% of the stoichiometrical amount of hydrocyanic acid can be recovered from the acetonitrile according to the following equation:

(1) $CH_3CN + 3/2 O_2 \rightarrow CO_2 + H_2O + HCN$

This means that merely 25 to 35% of the carbon contained in the acetonitrile are transformed into hydrocyanic acid.

We have now unexpectedly found that acetonitrile can be converted into hydrocyanic acid with a considerably improved yield calculated on the carbon contained in the acetonitrile and in a substantially more economic manner by reacting the acetonitrile in a gas mixture containing ammonia and air, the gas mixture used being preferably the reaction mixture employed for the manufacture of acrylonitrile, which consists, for example, of propylene, air, ammonia and optionally steam. The process of the present invention can be carried out in an especially economic manner as follows: the acetonitrile formed upon each passage is separated from acrylonitrile and hydrocyanic acid and recycled continuously into the process, that is to say admixed with the fresh gas mixture consisting of olefin, air, ammonia and steam, and then passed through the catalyst-charged reactor. During such operation, a part of the acetonitrile undergoes reaction with the resultant formation of hydrocyanic acid in a good yield, calculated on the carbon contained in the acetonitrile; unreacted acetonitrile is continuously cycled. This reaction takes the course shown in the following equation:

(2) $CH_3CN + NH_3 + O_2 \rightarrow 2HCN + 2H_2O$

The yield of hydrocyanic acid can be determined in the following manner:

(I) The molar amounts of acetonitrile (AN I) and hydrocyanic acid (HCN I), which are obtained upon reacting a mixture of an olefin, preferably propylene, ammonia and steam at the catalyst, are determined.

(II) The mixture defined (sub I) is admixed beforehand with an additional amount of acetonitrile (AN). The analysis of the reaction off-gas then indicates increased molar amounts of acetonitrile (AN II) and hydrocyanic acid (HCN II).

(III) Of the total (AN+AN I) mols acetonitrile present (AN+AN I−AN II) mols have undergone conversion into (HCN II−HCN °) mols hydrocyanic acid.

The C-yield of hydrocyanic acid, calculated on the acetonitrile reacted, is calculated as follows:

C-yield HCN =
$$\frac{\text{mol HCN II} - \text{mol HCN I}}{2(\text{mol AN} + \text{mol AN I} - \text{mol AN II})} \cdot 100\%$$

In tests carried out and calculated in the manner described above, hydrocyanic acid is obtained in yields as high as 90%, calculated on carbon.

According to this statement, which is based on Equation 2, it is unexpectedly not only the CN-group but also the CH$_3$-group of the acetonitrile that undergoes conversion into hydrocyanic acid.

The process of the present invention for transforming acetonitrile into hydrocyanic acid offers the particular advantage that more economic catalysts can be used for the conversion of propylene, ammonia and air into acrylonitrile. The catalysts must no longer be selected with a special view to low acetonitrile formation. In other words, catalysts can be used which are cheap to prepare and possess a good abrasion resistance and constant activity even if the yield of acetonitrile is primarily slightly increased.

The present process enables the primarily-formed acetonitrile to be converted into useful hydrocyanic acid with the proviso that the acetonitrile is recycled in an appropriate manner. For that purpose, the acetonitrile is advantageously combined with propylene, ammonia and air, so that the very same catalyst can be used for transforming acetonitrile into hydrocyanic acid and for reacting propylene, ammonia and air with the resultant formation of acrylonitrile. It is, however, also possible to carry out the conversion of acetonitrile into hydrocyanic acid in a reaction zone separated from the main reaction zone, i.e. in the absence of the olefin.

U.S. Pat. 3,050,546 to Milberger describes a process for the manufacture of acrylonitrile from propylene, which minimizes the production of hydrogen cyanide as a by-product of the reaction. Example III of Milberger shows that the recycle of acetonitrile, which is another by-product of the process, resulted in an increase in the production of acetonitrile in contact with a bismuth phosphomolybdate-catalyst containing 50% silica. In addition to propylene, air, ammonia and water, the starting gas contained 0.7 mol percent acetonitrile and the same proportion (0.7 mol percent) of hydrogen cyanide. While the resulting reaction gas was found to contain acrylonitrile and 13.3 mol percent acetonitrile it could not be found to even contain traces of hydrogen cyanide.

In clear contrast with Milberger, the present process, which uses a HCN-free and acetonitrile-containing starting gas mixture, produces a reaction gas mixture containing more HCN (cf. working Example 4 hereinafter) than a reaction gas mixture obtained by reaction of a comparable starting gas mixture comprised merely of air, propylene, ammonia and steam (cf. working Example 3 hereinafter).

The present invention relates more particularly to a process for the manufacture of hydrocyanic acid which comprises reacting acetonitrile in the presence of a member selected from the group consisting of oxygen and air, the gas mixture being free of hydrocyanic acid and containing about 0.05 to 10% by volume of acetonitrile, and in contact with a catalyst consisting essentially of at least one oxide of molybdenum, vanadium, tin, iron and bismuth, effecting the reaction at a temperature of about 300–550° C., the gas mixture remaining in contact with the catalyst for about 0.05–50 seconds.

For example, a gas mixture of air and about 1% by volume acetonitrile in vapor form is converted at the catalyst at a temperature within the range of 300 to 550° C., preferably 460° C., into hydrocyanic acid.

The acetonitrile can also be transformed into hydrocyanic acid at the catalyst in the presence of air and ammonia or an ammonia-containing gas and/or steam and/or propylene, if desired.

The acetonitrile used as the starting material may be the acetonitrile, for example, which is obtained as a by-product in the manufacture of acrylonitrile from propylene, ammonia, air and optionally steam with the use of the catalyst, the acetonitrile having been separated in known manner previously from its accompanying substances, especially acrylonitrile and hydrocyanic acid. The acetonitrile can, for example, be extracted with water and separated in known manner from a vaporous mixture of acetonitrile, acrylonitrile, and hydrocyanic acid.

It is especially adavntageous to recycle the separated acetonitrile continuously into the process for the manufacture of acrylonitrile and in this manner to transform it into hydrocyanic acid at the catalyst at temperatures within the range of about 300 to 550° C. in the presence of propylene, air, ammonia and, if desired, steam.

The gas mixture used in accordance with this invention contains preferably 0.3 to 3% by volume acetonitrile.

The catalyst may contain a phosphorus oxide (e.g. P$_2$O$_5$) as an additional component and may be supported on a carrier, for example, silica gel, aluminum oxide, aluminum phosphate, boron phosphate, pumice or a similar substance.

The following examples serve to illustrate the invention but they are not intended to limit it thereto:

EXAMPLE 1

Preparation of a catalyst suitable for use in carrying out the present process: 730 cc. of a ferri-nitrate solution containing altogether 365 g. Fe(NO$_3$)$_3 \cdot$9H$_2$O, 438 cc. of a nitric acid bismuth nitrate solution containing altogether 438 g. Bi(NO$_3$)$_3 \cdot$5H$_2$O, and 416 cc. of an ammonium molybdate solution containing altogether 208 g.

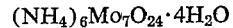

were admixed with one another, 10 cc. of 85% phosphoric acid were added, and the whole was introduced into 4,900 g. of 14% aqueous, colloidal silicic acid. The resulting mixture was then evaporated to dryness. The residue obtained was heated for 24 hours at 150° C. and for 16 hours at 500° C. After cooling, the catalyst so produced was ground to a grain size of 0.2 to 0.3 mm. and sieved.

1144 g. of catalyst of the following composition were obtained:

| | Percent by weight |
|---|---|
| Fe$_2$O$_3$ | 6.3 |
| Bi$_2$O$_3$ | 18.4 |
| MoO$_3$ | 14.8 |
| P$_2$O$_5$ | 0.5 |
| SiO$_2$ | 60.0 |

EXAMPLE 2

3.5 liters of the catalyst prepared as described in Example 1 were introduced into a vertically disposed reaction tube 7 m. long and 5 cm. wide, the upper end of which was provided with means for separating and returning the fluidized catalyst powder. The tube was charged from below per hour with 1450 normal liters (measured at N.T.P.) air containing 46 g.=1.12 mols acetonitrile in vapor form, and with 850 normal liters/hr. steam. The tube had a temperature of 460° C.

76.9% of the acetonitrile introduced underwent conversion. 100 mols of acetonitrile used yielded 59.6 mols hydrocyanic acid, that is to say the carbon yield was 29.8%.

EXAMPLE 3

A mixture of:

| | Normal liters/hr. |
|---|---|
| Air | 1720 |
| Propylene | 175 |
| Ammonia | 175 |
| Steam | 850 | was introduced into the reactor described in Example 2 while maintaining the reaction zone at a temperature of 460° C.

In addition to acrylonitrile, CO$_2$, CO, N$_2$ and O$_2$ in excess, the reaction gas contained 0.38 mol/hr. acetonitrile and 1.45 mol/hr. hydrocyanic acid.

EXAMPLE 4

The procedure was the same as in the preceding Example and the gas mixture used had the composition indicated in Example 3 but acetonitrile was introduced as an additional component into the reactor.

The inlet gas mixture thus consisted of:

|  | Normal liters/hr. |
|---|---|
| Air | 1720 |
| Propylene | 175 |
| Ammonia | 175 |
| Steam | 850 |
| Acetonitrile (0.78 mol/hr.) | 17.5 |

The gas mixture leaving the reactor contained the same amount of acetonitrile as in Example 3, $CO_2$, CO, $N_2$, oxygen in excess and in addition thereto:

|  | Mol/hr. |
|---|---|
| Acetonitrile | 0.565 |
| Hydrocyanic acid | 2.48 |

As compared with Example 3, Example 4 yielded an additional amount of 2.48−1.45=1.03 mols/hr. hydrocyanic acid. To produce the acid, $$0.78 + 0.38 - 0.565 = 0.595 \text{ mol/hr.}$$

acetonitrile was consumed. The C-yield of hydrocyanic acid, calculated on the acetonitrile reacted, was $$\frac{2.48 - 1.45}{2(0.78 + 0.38 - 0.565)} \cdot 100 = 86.5\%$$

We claim:

1. A process for the manufacture of hydrocyanic acid which comprises reacting acetonitrile in the presence of a member selected from the group consisting of oxygen and air, the mixture being free of hydrocyanic acid and containing about .05 to 10% by volume of acetonitrile, and in contact with a catalyst consisting essentially of $Fe_2O_3/Bi_2O_3/MoO_3/P_2O_5/SiO_2$; effecting the reaction at a temperature of about 300–550° C., the gas mixture remaining in contact with the catalyst for about 0.05–50 seconds.

2. The process of claim 1, wherein the acetonitrile is reacted in the presence of air and steam.

3. The process of claim 1, wherein the acetonitrile is reacted in the presence of air and a member selected from the group consisting of ammonia and an ammonia-containing gas.

4. The process of claim 1, wherein the acetonitrile is reacted in the presence of air, steam and a member selected from the group consisting of ammonia and an ammonia-containing gas.

5. The process of claim 1, wherein the acetonitrile is reacted in the presence of propylene, air, ammonia and steam.

References Cited

UNITED STATES PATENTS

| 2,904,580 | 9/1959 | Idol | 260—465.3 |
| 3,050,546 | 8/1962 | Milberger | 260—465.3 |

OSCAR R. VERTIZ, Primary Examiner

H. S. MILLER, Assistant Examiner

U.S. Cl. X.R.

252—437, 456; 260—465.3

UNITED STATES PATENT OFFICE

CERTIFICATE OF CORRECTION

Patent No. 3,516,789　　　　　　　　Dated June 23, 1970

Inventor(s) Kurt Sennewald et al

It is certified that error appears in the above-identified patent and that said Letters Patent are hereby corrected as shown below:

Column 1, after the listing of the inventors, insert --

, assignors to Knapsack Aktiengesellschaft, Knapsack, near Cologne, Germany. --

SIGNED AND SEALED

OCT 27 1970

(SEAL)
Attest:

Edward M. Fletcher, Jr.
Attesting Officer

WILLIAM E. SCHUYLER, JR.
Commissioner of Patents